United States Patent
Vincent et al.

[11] Patent Number: 6,137,079
[45] Date of Patent: Oct. 24, 2000

[54] TIG WELDING TORCH PERMITTING IMPROVING STRIKING THE WELDING ARC

[75] Inventors: Jean-Pierre Vincent, Commercy Cedex; Francis Briand, Paris, both of France

[73] Assignees: La Soudure Autogene Francaise, Paris Cedex; Sauvageau Commercy Soudure, Commercy Cedex, both of France

[21] Appl. No.: 09/324,887

[22] Filed: Jun. 3, 1999

[30] Foreign Application Priority Data

Jun. 4, 1998 [FR] France .................................. 98 07031

[51] Int. Cl.⁷ ....................................................... B23K 9/06
[52] U.S. Cl. ........................... 219/130.4; 219/74; 219/75; 219/136
[58] Field of Search ........................... 219/75, 74, 130.4, 219/136, 137.2, 137.42, 137.43

[56] References Cited

U.S. PATENT DOCUMENTS

| | | | |
|---|---|---|---|
| 3,284,609 | 11/1966 | Allen et al. | 219/130.4 |
| 3,431,390 | 3/1969 | Manz | 219/75 |
| 3,697,721 | 10/1972 | Robba et al. | 219/136 |
| 4,788,401 | 11/1988 | Kleppen | |

FOREIGN PATENT DOCUMENTS

| | | | |
|---|---|---|---|
| 33312 | 8/1981 | European Pat. Off. | 219/137.42 |
| 2236972 | 7/1974 | Germany | 219/136 |
| 35 42 984 | 6/1987 | Germany . | |
| 3711989 | 10/1988 | Germany | 219/74 |

OTHER PUBLICATIONS

By Falstrom Company, "Falstrom Flex–I–Torch for TIG Arc Welding".

*Primary Examiner*—Clifford C. Shaw
*Attorney, Agent, or Firm*—Young & Thompson

[57] ABSTRACT

The invention relates to an electric arc welding torch comprising a torch body having an electrode holder (3) and a nozzle (4), said nozzle (4) being formed with at least one nozzle partition (2) having an internal surface (2a) and an external surface (2b), characterized in that at least one supplemental partition (8) extends along at least one portion of the internal surface (2a) and/or external surface (2b) of the nozzle partition (2), in that one of said partitions (2, 8) is electrically conductive and in that the other of said partitions (2, 8) is electrically insulating and the use of such a torch in an electric arc welding or cutting process under a protective gas, particularly a TIG, MIG or MAG welding process.

16 Claims, 3 Drawing Sheets

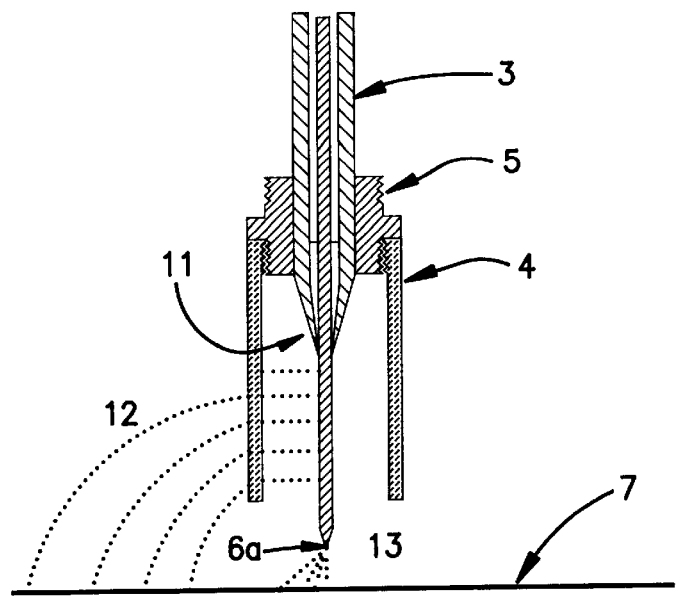
FIG. 4
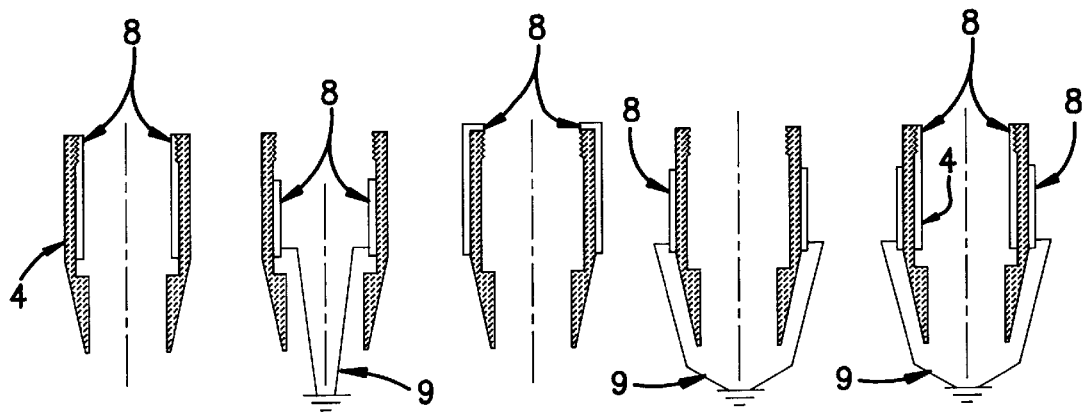
FIG. 5A  FIG. 5C  FIG. 5E
FIG. 5B  FIG. 5D
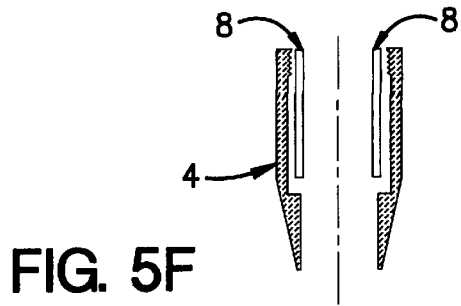
FIG. 5F

TIG WELDING TORCH PERMITTING IMPROVING STRIKING THE WELDING ARC

FIELD OF THE INVENTION

The present invention relates to a welding torch permitting obtaining better striking of the electric arc and to its use in an arc welding process, particularly TIG, MIG or MAG.

BACKGROUND OF THE INVENTION

During the practice of an electric arc welding process, it is necessary, at the beginning of the welding operation, to establish an electric arc between a cathode and an anode.

In general, establishing the electric arc, also called striking, can be carried out in two ways, namely by a short circuit or by use of high voltage.

More precisely, striking of the short circuit type consists in placing the cathode and the anode in contact with each other.

In this manner, there is created, upon establishing the short circuit, a current flow which heats two ends of the electrodes facing each other and there is then produced an electric arc upon progressive separation of the two electrodes from each other.

This type of short circuit striking is used particularly for TIG (Tungsten Inert Gas) welding in which the cathode is constituted by a tungsten electrode and the anode is constituted by the piece to be welded.

Similarly, short circuit striking is also used for MIG (Metal Inert Gas) welding in which the anode is a fusible wire and the cathode, again, is the piece to be welded.

It is to be noted however that when the anode is a fusible wire, it is not necessary to move the end of the fusible wire away from the cathode, upon striking the arc, because the intensity of the current is generally sufficiently great to melt the end of said wire and thereby permit the arc to be struck.

It is also possible to use striking by short circuit when practicing plasma cutting or in a process of surface treatment with an electric arc.

However, striking by short circuit has a major disadvantage, namely, requiring contact between the cathode and the anode, said contact being apt to give rise to pollution or premature wear or the cathode, in particular, when the latter is a tungsten electrode, thus requiring its more frequent replacement.

Accordingly, in TIG welding, striking by short circuit gives rise to a frequent regrinding of the tungsten electrode.

Moreover, it has been noted that inclusions of tungsten were likely to be found in the weld bead, which is prejudicial and decreases the quality of said weld bead.

These problems can at least in part be solved by striking of the high voltage type.

Thus, this type of striking uses high voltage pulses and does not require direct contact between the anode, which is to say the piece to be TIG welded, and the cathode.

However, for reasons of cost and safety, the generation of high voltage generally implies that each of the high voltage pulses in fact be a high voltage damped oscillation.

The high voltage thus used effects a breakdown of the dielectric usually formed by the protective gas used, by rendering said dielectric electrically conductive and thereby permitting the passage of the current and the striking of an electric arc.

The greater the distance between the cathode and the anode, the greater the amplitude of the high voltage necessary to establish the electric arc.

The high voltage striking process is particularly used in TIG welding, in plasma cutting and in plasma welding. In this latter case, the arc is struck, first between two electrodes, then transferred to the piece to be welded by the plasmagenic gas flow.

Sometimes high voltage striking is also used in MIG welding, in particular in MIG welding in which during each half-cycle the voltage is zero and the wire not being in contact with the material to be welded, it may be necessary to restrike the electric arc.

However, high voltage striking also has itself a certain number of drawbacks.

Thus, the use of high voltages generally gives rise to substantial electromagnetic noise adapted to disturb considerably the electromagnetic environment of the welder and whose level is subject to strict regulation.

Thus, the level of disturbance is proportional to the electric power used during the striking phase of the electric arc and, no matter what the welding process which uses this high voltage striking, it is ordinarily necessary to minimize the amplitude of the high voltage necessary to establish said electric arc.

To minimize said amplitude of high voltage necessary to establish the arc, one can in certain cases use a cathode or an anode with a pointed end and/or a small anode/cathode distance.

This is for example the case when welding and plasma cutting in which the arc is struck in general between the nozzle and the electrode of the plasma welding torch used.

In manual TIG welding, the operator is himself obliged to position correctly and precisely the electrode relative to the piece to be welded, which is not easily carried out in practice, particularly when a welding mask is used.

Conversely, in the case of poor positioning of the electrode relative to the piece to be welded, the amplitude of the high voltage applied may not be sufficient to strike effectively an electric arc and/or an excessively long striking time may be needed.

It follows that it is accordingly necessary to increase the amplitude of the high voltage pulses, which permits increasing the tolerance as to the workpiece/electrode distance and/or the sharpening of the electrode, and can lead on the contrary to an unacceptable level of electromagnetic noise.

SUMMARY OF THE INVENTION

The object of the present invention is accordingly to overcome the existing problems with high voltage striking, so as to obtain particularly a decrease of electromagnetic noise generated by the high voltage striking and, moreover, a striking which is satisfactory from an industrial standpoint.

In other words, the present invention seeks to improve significantly the high voltage striking of an electric arc by means of a welding or cutting torch provided with an electrode.

The present invention thus concerns a welding or cutting torch with an electric arc comprising a torch body having an electrode carrier and a nozzle, said nozzle being formed from at least one nozzle partition having an internal surface and an external surface, characterized in that at least one supplemental partition extends along and/or peripherally of at least one portion of the internal and/or external surface of the nozzle partition, in that one of said partitions is electrically conductive and in that the other of said partitions is electrically non-conductive, which is to say electrically insulating.

In the scope of the present invention, there is meant by electrically conductive partition that the partition permits conducting and transmitting the electric current by giving rise to low voltages.

On the other hand, there is understood by electrically insulating partition or non-conductive partition that the partition does not permit conducting and transmitting electric current giving rise to low voltages.

As the case may be, the torch according to the present invention can comprise one or several of the following characteristics:

the nozzle partition is electrically non-conductive;
said nozzle and said electrode carrier are connected by an annular member, also called a gripping seat, fixed on the torch body, said supplemental partition being electrically conductive and being at the same electrical potential as the electrode;
said nozzle and said electrode carrier are connected by an annular member fixed to the body of the torch, said supplemental partition being electrically conductive and being at the electrical potential of the piece to be welded or at the electrical potential of the ground;
said supplemental partition extends over all the periphery of the internal and/or external surface of at least a portion of the nozzle partition of the nozzle;
the downstream end of said supplemental partition is located at least about 0.5 cm from the downstream end of the nozzle, preferably at about mid-distance of the nozzle;
the thickness of the supplemental partition is comprised between 1 $\mu$m and 5 mm, preferably between 10 $\mu$m and 1 mm;
the internal and/or external surface of the nozzle partition is at least partially covered with at least one layer of at least one electrically conductive material selected from aluminum, titanium, molybdenum, nickel, graphite, manganese and conductive enamels, preferably an alloy of molybdenum and manganese, said layer of material forming the supplemental partition;
the nozzle partition is made of an electrically non-conductive material selected from enamels, ceramics, preferably alumina or silicon nitride;
the supplemental partition is a layer of electrically conductive cladding deposited on at least one portion of the surface of the nozzle partition, preferably on the internal surface;
the supplemental partition is an axial prolongation of the annular member;
the supplemental partition is in contact with the nozzle partition;
the supplemental partition is spaced from 0 to 5 mm from said nozzle partition.

The invention moreover relates to a welding nozzle adapted to be used on a welding torch according to the invention, having substantially the form of a sleeve, preferably cylindrical or truncated cylindrical, and being formed from a nozzle partition, characterized in that it is electrically insulating and in that it comprises on at least a portion of at least one of its internal or external surfaces, at least one layer of an electrically conductive cladding forming the supplemental partition.

The invention relates moreover to the utilization of a torch according to the invention, in a welding or cutting process with an electric arc under a protective gas, particularly a TIG, MIG or MAG welding process.

BRIEF DESCRIPTION OF THE DRAWINGS

The present invention will now be described in greater detail with reference to the drawings of one embodiment, given by way of non-limiting example.

FIG. 4 is a schematic representation of electric field lines adapted to form at the end of a welding torch having a nozzle as in FIG. 2;

FIGS. 5(*a*)–5(*f*) represent six modes of different embodiments of a nozzle carrying an electrically conductive cladding or supplemental partition in longitudinal cross-section;

DETAILED DESCRIPTION OF THE INVENTION

Figure 1:
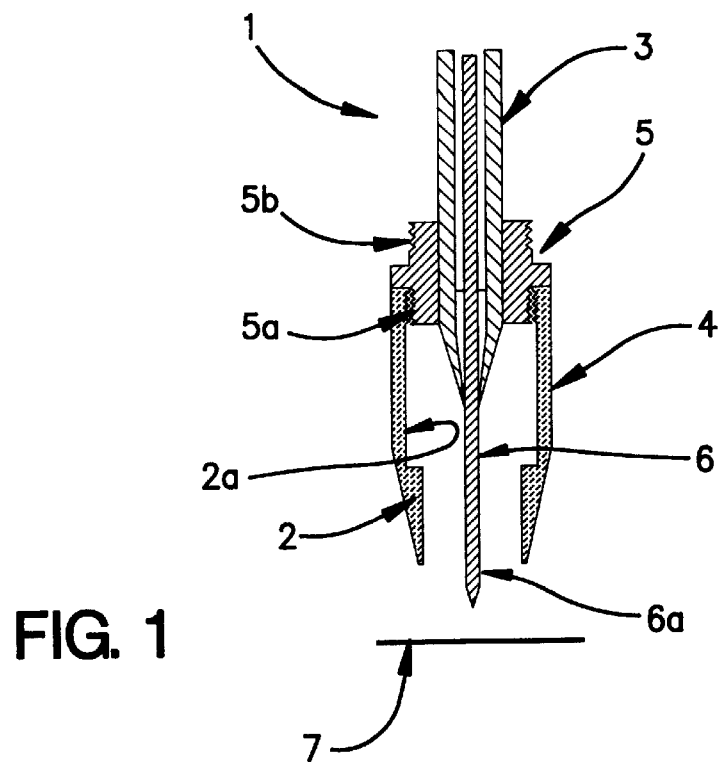
FIG. 1 is a schematic representation in transverse cross-section of the end of an electric arc welding torch.

FIG. 1 shows schematically in transverse cross-section a portion of the end of an electric arc welding torch 1, such as a TIG torch, comprising an electrode holder 3 carrying an electrode 6 and a nozzle 4 having substantially the shape of a sleeve, which surrounds a portion of said electrode holder 3 and said electrode 6.

The nozzle 4 is fixed on the electrode carrier 3 by means of an annular member 5, also called a gripping seat, fixed on the one hand to said electrode carrier 3 and on the other hand to said nozzle 4 and to the torch body (not shown) by means of screw threads 5*a* and 5*b*, respectively.

The electrode carrier 3 permits holding the electrode 6 during the welding operation, during which an electric arc is struck between the end 6*a* of the electrode 6 and the material 7 to be welded or cut.

The nozzle 4 is formed by a nozzle partition 2 of substantially cylindrical truncated conical cross-section and forming a sleeve about the electrode 6. The nozzle partition 2 comprises an internal surface 2*a* and an external surface 2*b*.

Conventionally, the partition of the nozzle 4 is made of an electrically non-conductive material, which is to say insulating, such as a dielectric material, such as a ceramic, preferably alumina.

Thus, it is necessary that the impedance of the nozzle 4 be relatively high to prevent the welding current to pass through it during striking the electric arc or upon contact between the nozzle 4 and the piece 7 to be welded.

Moreover, during a welding operation, the nozzle 4 is at a very high temperature, for example more than 1000° C., and it is therefore necessary to use a material capable of resisting such temperatures.

Figure 2:
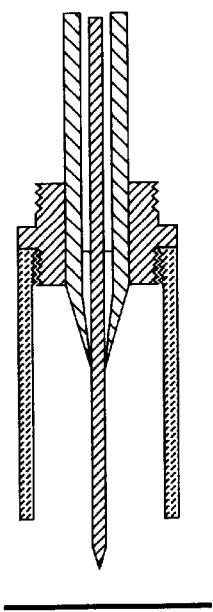
FIG. 2 depicts a nozzle having a substantially cylindrical shape.
Figure 3:
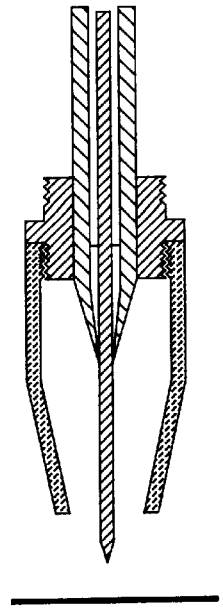
FIG. 3 depicts a nozzle having a cylindrical truncated conical shape.

As a function of the welding currents used and of the nature of the protective gas used, the nozzle 4 can have various shapes and have variable dimensions. Thus, there are shown in FIGS. 2 and 3 nozzles of different shapes from that shown in FIG. 1. More precisely, FIG. 2 shows a nozzle of substantially cylindrical shape, while FIG. 3 shows a nozzle having a cylindrical truncated conical shape.

Generally speaking, when it is desired to strike an electric welding arc between the electrode 6 and the material 7 to be welded, and this without placing the electrode 6 in direct contact with said material 7, there is sent one or several high voltage pulses into the electrode to break down the dielectric constituted by the welding gas present between the end 6a of the electrode 6 and the metal plate 7 to be welded.

However, the nozzle 4 and more precisely the nozzle partition 2 is constituted by a dielectric, which is to say that it is at an electric potential different from that of the assembly formed particularly by the electrode 6, the annular member 5 and the electrode holder 3.

The inventors of the present invention have determined that, when at least a portion of the internal and/or external surface of the partition 2 constituting the nozzle 4 is covered, that is to say clad, with an electrically conductive material forming a supplemental electrically conductive partition 8, said supplemental partition 8 or cladding is in contact not only with the nozzle 4 but also with the annular member 5, so as to place said cladding at the same potential as said annular member, the latter being itself at the same potential as the electrode 6, whereupon the striking of the electric arc can be considerably improved whilst decreasing the amplitude of the high voltage necessary for said striking of the electric arc and hence also the electromagnetic disturbances generated by this high voltage.

Thus, the fact of cladding a portion of the surface of the nozzle 4 with an electrically conductive material and having this cladding or supplemental partition 8 at the same potential as the electrode or the ground, gives rise to a different distribution of the electrical energy in said nozzle.

Thus, in the case of a conventional nozzle of the prior art, which is to say a nozzle having a partition constituted solely by an insulating material having a dielectric behavior, there exists a potential difference between said nozzle and the electrode.

More precisely, the polarization of the electrode induces electrostatically charges of opposite signs on the internal surface of the nozzle and the nozzle/electrode assembly behaves then as a cylindrical electrical condenser, in which prevails an electric field which stores a portion of the electrical energy.

It then follows that the energy thus stored, emitted by the high voltage generator, is no longer available for striking and the latter takes place in a less effective manner.

Conversely, in a nozzle according to the invention, the electrode and at least a portion of the surface of the nozzle, preferably the internal surface of the nozzle, being at the same potential, the electric field no longer forms and all the electrical energy supplied by the high voltage source is thus available and usable to strike the arc in a more effective manner.

FIG. 4 shows schematically the lines of electrical field adapted to form at the end of a welding torch comprising a nozzle 4 similar to that shown in FIG. 2.

Thus, when the electrode is polarized, there appear lines of electrical field at the end of the welding torch, which lines of electrical field are distributed schematically in three regions, namely an internal region 11 located at the interface of the nozzle 4, an external region 12 located between the external surface of the nozzle 4 and the material 7 to be welded, and an intermediate region 13 located between the end 6a of the electrode 6 and the material 7.

The fact of cladding a portion of the nozzle 4 with an electrically conductive material and bringing this cladding or supplemental partition 8 to the same potential as the electrode or the ground, permits reducing or even totally eliminating the electrical energy stored in the regions 11 and 12 by the bias of the capacitative effects, as explained above.

More precisely, when the interior of the nozzle 4 is clad with a supplemental partition 8 of an electrical conductor at the same potential as the electrode 6, it is possible to eliminate the largest part of the energy stored in the region 11, but only partially that in the region 12.

On the contrary, when the interior of the nozzle 4 is clad with an electrical conductor at the potential of the ground or of the material 7 to be welded, there is then a dissipation of the energy stored in the region 12, but a slight increase of the residual energy stored in the region 11 and this with the risk of breaking down said region 11, when the distance separating the conductive cladding of the electrode 6 is more than the distance separating the end 6a of the electrode 6 from the metal plate 7 to be welded.

Moreover, when an electrical conductor is disposed against the external surface of the partition 2 of the nozzle 4 and is at the same potential as the electrode, the energy stored in the region 11 then disappears.

However, when there is utilized a partition coated on its external surface with an electrically conductive cladding according to the present invention and is at the electrical potential of the electrode, it is necessary to avoid any accidental contact between the operator and the nozzle to avoid any risk of electrocution of said operator.

Conversely, when the electrical conductor is disposed on the external surface of the nozzle 4 and is at the potential of the ground or of the piece 7 to be welded, there will then be experienced a disappearance of the energy stored in the region 12.

When the two are done at the same time, there is thus eliminated not only the energy stored in the region 11 but also the energy stored in the region 12, but there is a risk that a breakdown of the dielectric of the nozzle 4 could result.

It is thus necessary that the dielectric material of which the partition 2 and the nozzle 4 are constituted, be a dielectric adapted to give an effective electrical insulation.

In other words, there are at least six modes of different embodiments, which have been shown in FIGS. 5a to 5f, which represent a nozzle 4 carrying an electrically conductive cladding or supplemental partition 8 shown in longitudinal cross-section.

More precisely, FIG. 5a shows a supplemental partition 8 forming an electrically conductive cladding on the internal surface of the nozzle 4, which cladding is at the same potential as that of the electrode (not shown).

FIG. 5b is similar to FIG. 5a, except that the cladding or supplemental partition 8 is at the potential of the ground 9 or of the material to be welded.

FIG. 5c shows schematically an electrically conductive cladding or partition 8 provided on the external surface of the nozzle 4 and at the same potential as that of the electrode.

FIG. 5d is similar to FIG. 5c, except that the partition 8 is carried at the same potential 9 as the ground or the material to be welded.

FIG. 5e shows a nozzle 4 having two electrically conductive claddings or supplemental partitions 8, one being carried by the internal surface of the nozzle 4 and the other by the external surface of said nozzle 4. The internal cladding of the nozzle is at the potential of the electrode and the external cladding is as to itself at the potential of the ground.

FIG. 5f is similar to FIG. 5a, except that the supplemental partition 8 is no longer in this case in contact with the internal surface of the nozzle 4, but is spaced from the latter.

The electrically conductive cladding or supplemental partition 8 can be constituted of a material or an alloy of electrically conductive material, such as aluminum, titanium, molybdenum, nickel, graphite or conductive enamels, and can be deposited on the nozzle by techniques known to those skilled in the art, for example by spraying, projection or electrolysis.

When the cladding or supplemental partition 8 must be at the potential of the electrode 6, it is necessary that there is at least an electrically conductive contact between said cladding or supplemental partition 8 and the electrode 6, directly or by the bias of the annular member and/or of the electrode holder 3.

Thus, when the cladding or supplemental partition 8 is carried by the internal surface of the nozzle 4, to carry out said electrical contact, at least a portion of the screw threading of the nozzle can be clad with said electrically conductive material constituting the cladding or supplemental partition 8.

Conversely, when the cladding or supplemental partition a is carried by the external surface of the nozzle, to cause electrical contact with the electrode 6, the upper portion of the nozzle 4 can be clad with said electrically conductive material constituting the cladding or supplemental partition 8.

It should be noted that the cladding or supplemental partition 8 must be able to resist on the one hand the mechanical pressure exerted during gripping of the nozzle on the annular member 5 and, on the other hand, resist important heating of said nozzle 4 during the welding operation.

As a modification, it is also possible to prolong the annular member 5, or even the body of the torch, axially in the direction of the end 6a of the electrode 6, so as to form a supplemental partition 8.

Figure 6:
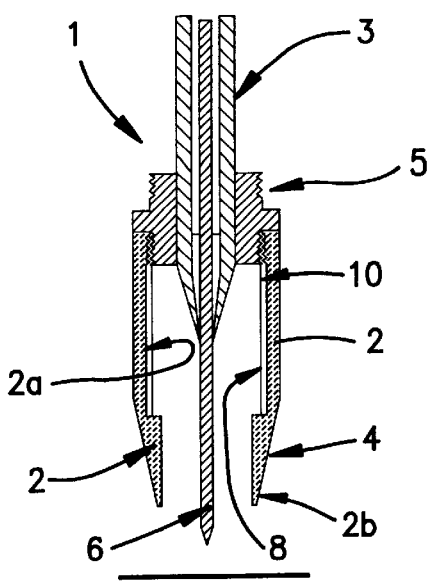
FIGS. 6 and 7 depict an electric arc welding torch having an annular member which is prolonged in the direction of the electrode end.
Figure 7:
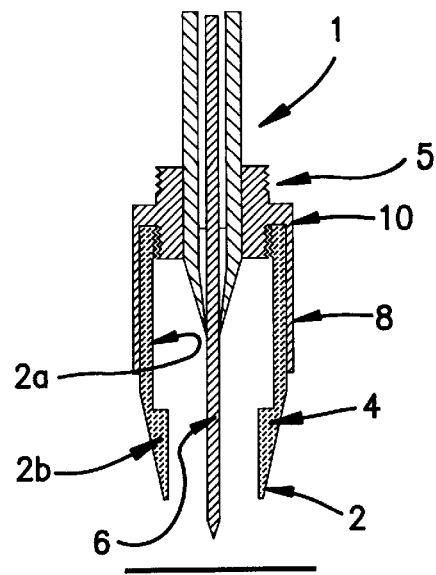

It therefore follows that the prolongation 10, forming the supplemental partition 8, is constituted of the same electrically conductive material as that of which is made the annular member 5 carried by the torch body and on which is fixed the nozzle 4. Such embodiments are shown in FIGS. 6 and 7.

Generally speaking, the nozzle 4 comprises a nozzle partition 2 having an external surface 2b and an internal surface 2a and a supplemental partition 8 comprises also as seen in the accompanying drawings, an internal surface and an external surface.

Beyond that, when the supplemental partition 8 is made by deposit by one or several layers of cladding on for example the internal surface 2a of the nozzle 4, it will be understood that the external surface of said supplemental partition 8 or cladding layer blends with the internal surface 2a of the nozzle 4 by being in contact with the latter.

Moreover, when the partition 8 is a prolongation 10 of the annular member 5, then its external surface can be, here again, merged in contact with the internal surface 2a of the nozzle 4 or, on the contrary, spaced from this latter by a distance ranging from several μm to several mm (see FIG. 5f).

Moreover, FIGS. 8a to c and 9a to c show schematically in longitudinal cross-section a nozzle 4 having as a supplemental partition 8 an electrically conductive cladding or supplemental partition 8 on the internal or external surface of the nozzle partition 2, according to the present invention.

Figure 8A:
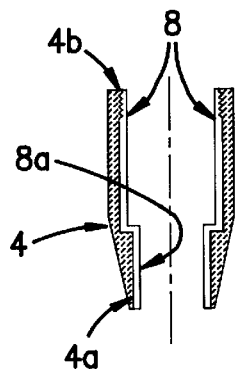
FIGS. 8(*a*)–8(*c*), and 9(*a*)–9(*c*) depict schematically in longitudinal cross-section a nozzle having a supplemental partition on the internal or external surface of the nozzle partition, according to the present invention.
Figure 9A:
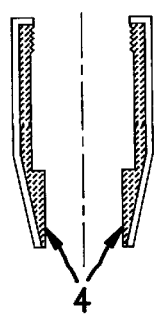
Figure 9B:
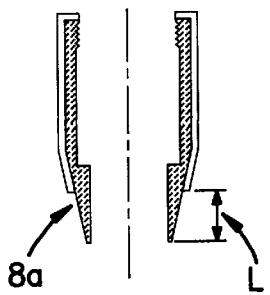

More particularly, when the conductive cladding or supplemental partition 8 carried by the nozzle 4 is connected to the potential of the electrode 6, its length can be equal to that of the nozzle 4, which is to say that the electrically conductive cladding can be provided over all the internal and/or external surface of the nozzle 4 from its upstream end 4a connected to the annular member 5 or gripping seat, to its downstream end 4b, as shown in FIGS. 8a and 9a, respectively.

However, it is not always necessary that the length of the cladding carried by the nozzle 4 have a length equal to that of the nozzle 4, which is to say that the partition 8 can extend only over a portion of the surface or surfaces of the nozzle 4.

Thus, FIGS. 8b and 8c and 9b and 9c show embodiments in which the cladding is applied only on the portion of the internal surface (FIGS. 8b and 8c) or external surface (FIGS. 9b and 9c) of the nozzle 4.

Figure 8B:
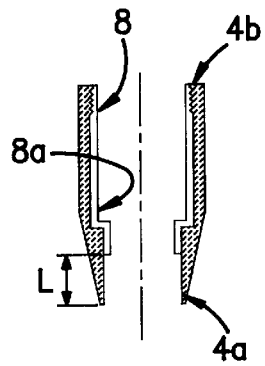
Figure 8C:
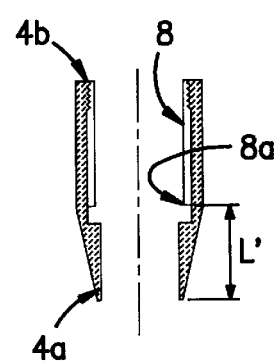
Figure 9C:
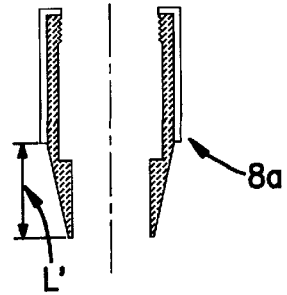

More precisely, in FIGS. 8a and 8b, the end 8a of the partition 8 is located at a distance equal to approximately 0.5 cm from the end 4a of the nozzle 4, whilst in FIGS. 8c and 9c, the end 8a of the supplemental partition 8 is located at a distance L' from the end 4a of the nozzle 4 equal approximately to half the length of the nozzle 4.

The layer of electrically conductive cladding can have a variable thickness ranging from several Angstroms to half the distance which separates the internal surface from the nozzle of the electrode, preferably between 10 μm and 1 mm.

It is to be noted however that the length and thickness of the layer of electrically conductive cladding will affect the improvement of striking an electric arc and the conduction of the heat over the upper portions of the welding torch.

EXAMPLE

A TIG welding torch comprising a conventional nozzle type, which is to say not clad with a layer of cladding or electrically conductive supplemental partition 8, surrounding a tungsten electrode subjected to an amplitude of high voltage of 8 kV, has permitted obtaining triggering of an electric arc of a length of 2 mm (distance from the electrode to the piece to be welded); striking was carried out under a protective flux of the argon type.

The same TIG torch is then provided with a nozzle comprising an electrically conductive cladding according to the present invention, said cladding forming a partition 8 extending over the internal surface of the nozzle, as shown in FIG. 6.

In this case, the layer of cladding has a thickness of about 30 μm and is constituted by a deposit of a molybdenum/manganese alloy.

The TIG torch provided with a nozzle according to the invention is then polarized with a high voltage amplitude of 8 kv, which permits striking an electric arc of at least 4 mm beneath a flux of protective gas of the argon type.

It is accordingly apparent that a TIG torch provided with a nozzle according to the present invention permits substantially improving the striking of the electric arc generated between the electrode and the piece to be welded.

Thus, in the present case, the striking distance has been multiplied by two.

A nozzle and a torch according to the present invention have numerous advantages relative to those of the prior art.

What is claimed is:

1. An electric arc welding torch comprising:
   a torch body having an electrode holder, and a nozzle having a screw threading; said nozzle comprising at least one nozzle partition having an internal surface and an external surface;
   at least one supplemental partition extending at least along or peripherally of at least one portion of one of the internal surface and external surface of the nozzle partition; and
   wherein the nozzle partition is electrically insulating, and the supplemental partition is electrically conductive and at the same electrical potential as the electrode.

2. The torch according to claim 1, wherein said nozzle and said electrode holder are connected by an annular member fixed to the torch body.

3. The torch according to claim 2, wherein the supplemental partition is an axial prolongation of the annular member.

4. The torch according to claim 3, wherein the supplemental partition is in contact with the nozzle partition.

5. The torch according to claim 3, wherein the supplemental partition is spaced from 0 to 5 mm from said nozzle partition.

6. The torch according to claim 1, wherein the supplemental partition is a cladding of electrically conductive material carried by at least a portion of the screw threading of the nozzle.

7. The torch according to claim 1, wherein the supplemental partition is a cladding of electrically conductive material carried by the external surface of the nozzle.

8. The torch according to claim 1, wherein the supplemental partition extends over all the periphery of at least one of the internal surface and the external surface of at least one portion of the nozzle partition.

9. The torch according to claim 1, wherein each of the supplemental partition and the nozzle have a downstream end, and the downstream end of the supplemental partition is located at at least about 0.5 cm from the downstream end of the nozzle.

10. The torch according to claim 1, wherein the thickness of the supplemental partition ranges between 1 $\mu$m and 5 mm.

11. The torch according to claim 1, wherein the supplemental partition is made of at least one electrically conductive material selected from aluminum, titanium, molybdenum, nickel, graphite, manganese and conductive enamels, or mixtures thereof.

12. The torch according to claim 1, wherein the nozzle partition is made of an electrically non-conductive ceramics material.

13. The torch according to claim 12, wherein the non-conductive ceramics material is alumina.

14. The torch according to claim 1, wherein the supplemental partition comprises at least a layer of electrically conductive cladding disposed over at least a portion of the nozzle partition.

15. The torch according to claim 14, wherein the layer of electrically conductive cladding is disposed over the internal surface of the nozzle partition.

16. A welding nozzle adapted to be used on a welding torch according to claim 1, having substantially a sleeve shape and being formed from at least one nozzle partition, said nozzle being electrically insulating and comprising over at least a portion of at least one of its internal and external surfaces, at least one layer of a cladding comprising at least one electrically conductive material forming a supplemental partition; wherein the cladding or supplemental partition is carried by the internal surface of the nozzle, and at least a portion of the screw threading of the nozzle is clad with said electrically conductive material constituting the cladding or supplemental partition.

* * * * *